United States Patent
Aguirre et al.

(10) Patent No.: US 10,433,207 B2
(45) Date of Patent: Oct. 1, 2019

(54) LOAD BALANCING TO PROVIDE A TARGET GRADE OF SERVICE (GOS)

(75) Inventors: Sergio Aguirre, Southlake, TX (US); Lalit R. Kotecha, San Ramon, CA (US); Kamlesh S. Kamdar, Dublin, CA (US); Raafat Edward Kamel, Little Falls, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2569 days.

(21) Appl. No.: 12/914,472

(22) Filed: Oct. 28, 2010

(65) Prior Publication Data

US 2012/0106346 A1    May 3, 2012

(51) Int. Cl.
*H04W 28/08* (2009.01)
*H04W 36/30* (2009.01)

(52) U.S. Cl.
CPC ............ *H04W 28/08* (2013.01); *H04W 36/30* (2013.01)

(58) Field of Classification Search
None
See application file for complete search history.

(56) References Cited

U.S. PATENT DOCUMENTS

| | | | | |
|---|---|---|---|---|
| 8,503,400 B2* | 8/2013 | Park | ...................... | H04W 36/30 370/331 |
| 8,730,805 B2* | 5/2014 | Arnott | ................... | H04L 5/0007 370/232 |
| 2005/0179607 A1 | 8/2005 | Gorsuch et al. | | |
| 2007/0173303 A1 | 7/2007 | Viorel et al. | | |
| 2009/0163223 A1* | 6/2009 | Casey | ................... | H04W 36/22 455/453 |
| 2010/0039987 A1* | 2/2010 | Hegde | ................... | H04W 40/02 370/328 |
| 2010/0311321 A1 | 12/2010 | Norin | | |
| 2010/0313232 A1 | 12/2010 | Norin | | |
| 2011/0002221 A1* | 1/2011 | Turk | ..................... | H04W 36/22 370/235 |
| 2011/0261695 A1* | 10/2011 | Zhao | ...................... | H04L 47/29 370/232 |

* cited by examiner

*Primary Examiner* — Hong S Cho

(57) ABSTRACT

A method includes receiving metrics associated with traffic that complies with a grade of service (GOS) associated with a customer premises equipment (CPE) device, where the metrics identify a group of cells via which the traffic is received by the CPE device. The method also includes retrieving information associated with traffic conditions within a group of base stations; initiating a load balancing operation when traffic conditions within a base station indicate that a particular cell, associated with the base station, is congested; and sending, to a set of base stations that send traffic to the CPE device, a notification, where the notification causes traffic, not destined for the CPE device, to be rerouted to another base station, which enables the base station to send traffic, that complies with the GOS, to the CPE device, or causes the CPE device to receive traffic, that complies with the GOS, from a further based station.

25 Claims, 7 Drawing Sheets

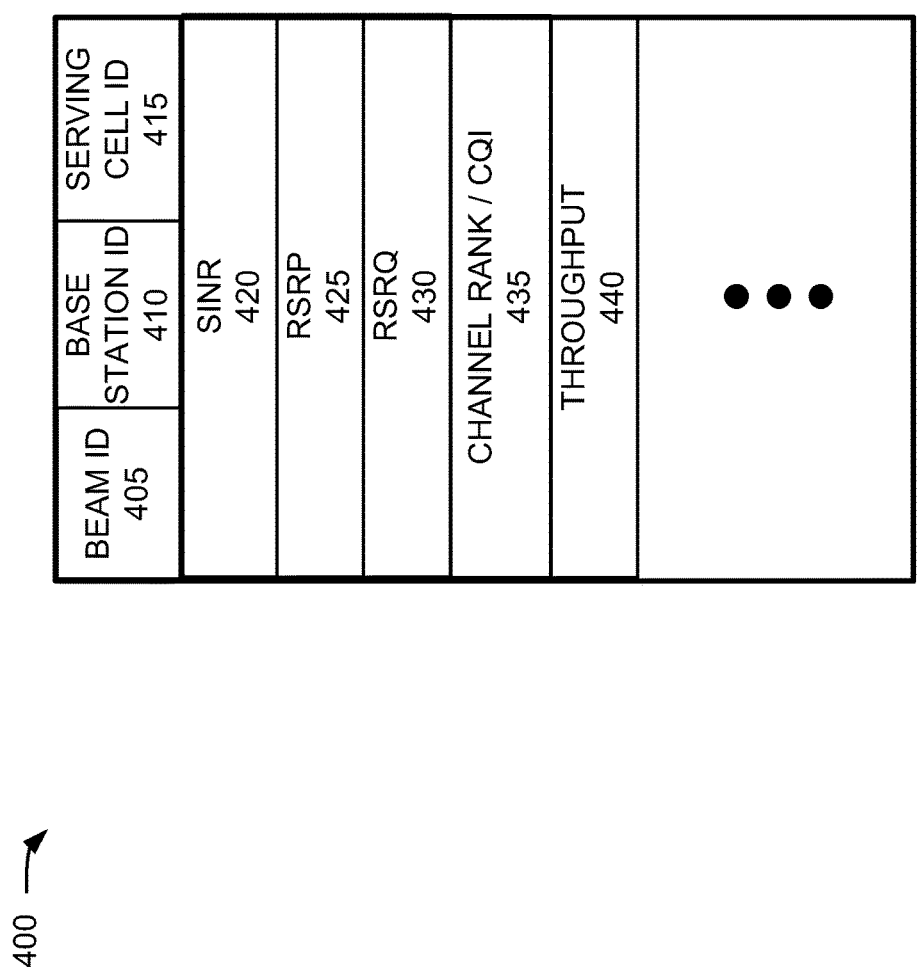

| BASE STATION ID 605 | CELL ID 610 | LOADING CONDITION 615 | RESERVE CAPACITY 620 |
|---|---|---|---|
| 1 | 1A | TRAF1A | CAP1A |
| 1 | 1B | TRAF1B | CAP1B |
| 2 | 2A | TRAF2A | CAP2A |
| 2 | 2B | TRAF2B | CAP2B |
| 2 | 2C | TRAF2C | CAP2C |
| 3 | 3A | TRAF3A | CAP3A |
| 3 | 3B | TRAF3B | CAP3B |

LOAD BALANCING TO PROVIDE A TARGET GRADE OF SERVICE (GOS)

BACKGROUND INFORMATION

Bundled media services (e.g., combination packages of television, telephone, and broadband Internet services) have been successfully offered to households with wired connections to service provider networks. Households in areas without such wired connections (e.g., customer in regions that cannot be reached via conventional communication media, such as optical cables, copper cables, and/or other fixed wire-based technologies) may rely on fixed wireless services for some of these services (e.g., broadband access). However, previous generations of fixed wireless services have generally been unsuccessful. Expensive network equipment and customer premises equipment (CPE), high CPE installation costs, use of proprietary technology, and low data rates are among some of the reasons these fixed wireless services remain unpopular.

As wireless network data rates improve, using fourth generation (4G) technologies, fixed wireless networks are able to successfully deliver fixed wireless services to households. However, the improved data rates may be difficult to maintain during fluctuations in usage patterns, changes in network performance, and/or as more and more households use fixed wireless services, which may cause a disruption and/or degradation in the fixed wireless services delivered to households.

BRIEF DESCRIPTION OF THE DRAWINGS

FIGS. 4A and 4B are diagrams of example data structures that may be used by the antenna unit of FIG. 1;

FIG. 6 is a diagram of an example data structure that may be stored in a CPE management server according to an implementation described herein.

DETAILED DESCRIPTION OF PREFERRED EMBODIMENTS

Figure 1:
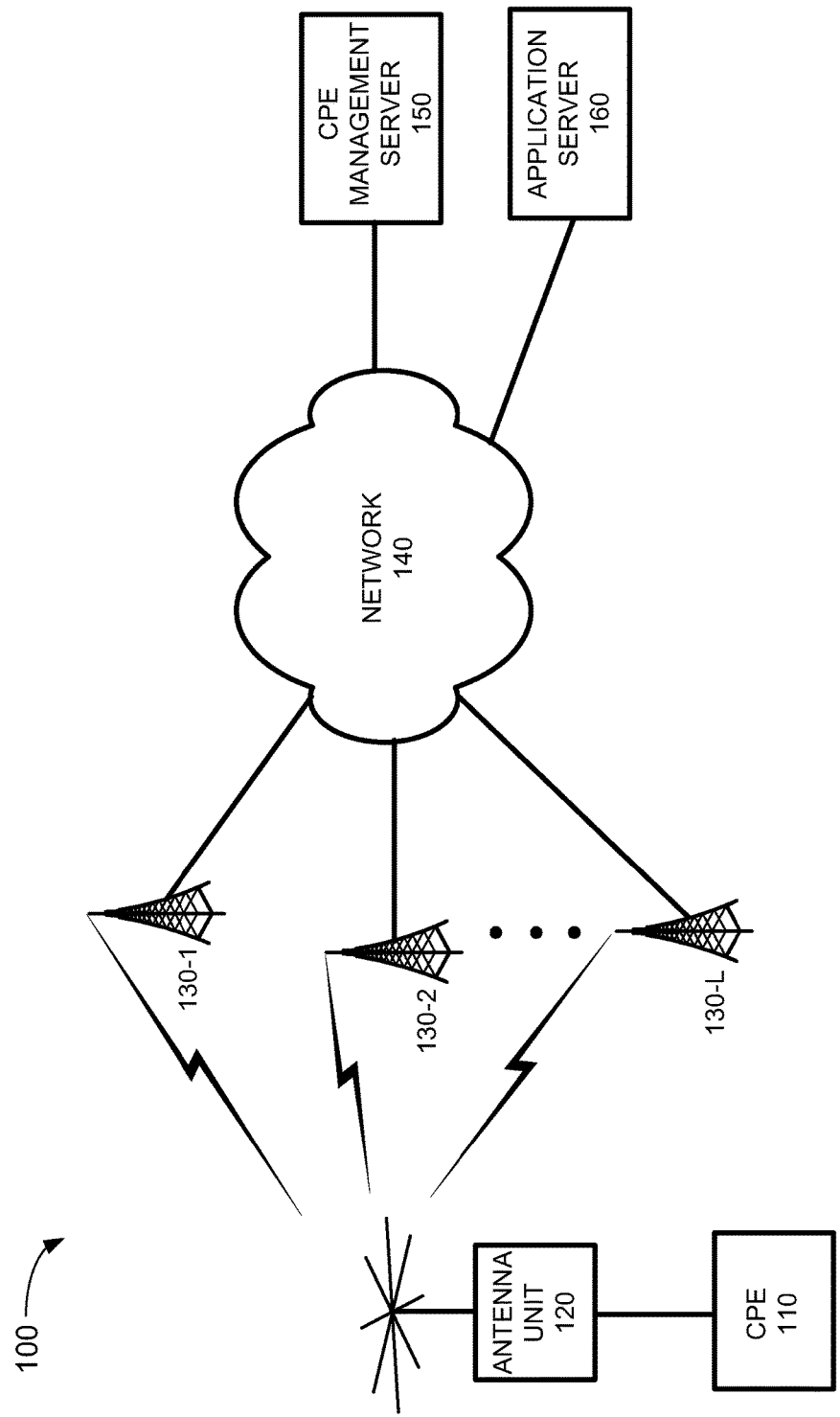
FIG. 1 is a diagram of an example environment in which system and/or methods, described herein, may be implemented.

The following detailed description refers to the accompanying drawings. The same reference numbers in different drawings identify the same or similar elements. Also, the following detailed description does not limit the invention.

An implementation described herein may include systems and/or methods that enable a load balancing application to manage network traffic in a manner that ensures that a target grade of service is provided to customer-premises equipment (CPE) connected to a fixed wireless network.

The term "grade of service (GOS)," as described herein, may be associated with traffic (e.g., being sent to the CPE to provide the fixed wireless services) that is associated with a throughput (e.g., greater than a data rate threshold) that satisfies the GOS, a bandwidth (e.g., greater than a bandwidth threshold) that satisfies the GOS, a signal power (e.g., greater than a signal power threshold) that satisfies the GOS, a signal quality (e.g., greater than a signal quality threshold) that satisfies the GOS, and/or a quality of service (QoS) (e.g., relative to one or more QoS thresholds) that satisfies the GOS. A target GOS may be based on a tier of service, as subscribed to by a user of the CPE, which may include a basic tier of service, a premium tier of service, an intermediate tier of service, and/or another tier of service. The basic tier may, for example, be associated with a minimum GOS that corresponds to a low cost (below a threshold). The premium tier may, for example, be associated with a maximum GOS that corresponds to a maximum cost (e.g., greater than a premium threshold). The intermediate tier may be associated with an intermediate GOS that is greater than the basic tier GOS and less than the premium tier GOS. The intermediate GOS may be associated with an intermediate cost (e.g., that is greater than the threshold and less than the premium threshold).

In an example implementation, the load balancing application may perform a load balancing operation by causing traffic to be transferred between base stations, within the fixed wireless network, to ensure that traffic, which complies with a target GOS, is provided to the CPE. For example, the load balancing application may perform the load balancing operation based on information associated with real-time traffic conditions within the fixed wireless network (e.g., data rates, bandwidth, traffic load, available capacity, etc.). In another example, the load balancing application may perform the load balancing operation using information associated with a traffic condition trend within the fixed wireless network (e.g., throughput, bandwidth, traffic load, available capacity, etc.) as a function of time, such as during peak, non-peak, and/or other periods. In yet another example, the load balancing application may perform the load balancing operation based on information associated with the traffic being received by the CPE from a base station (e.g., signal power, signal quality, data rate, etc.). The load balancing operation may include instructing a base station, via which traffic is sent to or received from the CPE, to transfer the network traffic to and/or from another base station in order to ensure that the traffic, being received and/or transmitted by the CPE, satisfies a target GOS for which a user of the CPE has subscribed.

FIG. 1 is a diagram of an example environment 100 in which system and/or methods, described herein, may be implemented. As shown in FIG. 1, environment 100 may include a CPE device 110, an antenna unit 120, one or more base stations 130-1, 130-2, . . . , 130-L (where L≥1) (hereinafter referred to collectively as "base stations 130" or individually as "base station 130"), a network 140, a CPE management server 150, and an application server 160.

In practice, environment 100 may include additional devices and/or networks, fewer devices and/or networks, different devices and/or networks, or differently arranged devices and/or networks than are shown in FIG. 1. Additionally, or alternatively, one or more devices and/or networks of environment 100 may perform the tasks described as being performed by one or more other devices and/or networks of environment 100.

CPE device 110 may include one or more devices that receive signals from or transmit signals to network 140. For example, CPE device 110 may include a set-top box, a video client device, a television, a computer, a network device (e.g., a router, a switch, or a gateway), a gaming console, a communication device (e.g., a telephone terminal), any combination thereof, or any other electronic device capable of receiving signals from network 140.

Antenna unit 120 may include a multiple beam antenna, a switch for selecting one or more beams of the multiple beam antenna, and an adaptive beam controller to control the switch. In a one implementation, antenna unit 120 and CPE device 110 may be part of the same device (e.g., encased in the same housing and/or chassis). In another implementation, antenna unit 120 and CPE device 110 may be separate devices, connected via a wired connection (e.g., coaxial cable) and/or a wireless connection (e.g., a Bluetooth connection).

Base stations 130 may include one or more devices and other components and functionality that allow CPE device 110 to wirelessly connect to network 140. One or more of base stations 130 may receive traffic, such as data signals, and/or real-time audio, voice and/or video signals, from network 140 and may transmit the received traffic to antenna unit 120 as wireless signals. One or more of base stations 130 may receive traffic from antenna unit 120 and may transmit the received traffic to network 140 as wired and/or wireless signals. In response to a load balancing instruction, base station 130 may transfer traffic to another base station 130 in order to balance traffic within network 140. In one example implementation, base station 130 may include an eNodeB that utilizes LTE standards operating in a particular frequency band (e.g., a 700 MHz frequency band). In another example, base station 130 may include a low-latency and/or high throughput interface (e.g., an X2 interface), that enables base station 130 to transfer traffic to another base station 130 as part of a load balancing operation and/or a handover operation.

A particular base station 130 may be associated with one or more cells. Each cell may cover a particular geographic area and each cell may include one or more radio frequency (RF) transmitters and a corresponding antenna pointed in a particular direction. For example, in one implementation, base station 130 may include three cells, where each cell covers approximately 120 degrees of the area surrounding base station 130. In another implementation, cells of base station 130 may be geographically distributed and need not be adjacent to one another.

Base stations 130 may transmit reference signals at particular intervals. The transmitted reference signals may include information such as a power level at which the signal is transmitted, and/or reference symbols which may be used by a receiving device to compute metrics, such as signal-to-interference noise ratio (SINR), received reference signal received power (RSRP), path loss, reference signal received quality (RSRQ), and/or channel rank and channel quality indicators.

Network 140 may allow the delivery of Internet Protocol (IP) broadband services to CPE device 110, and may interface with other external networks. Network 140 may include one or more server devices and/or other types of network devices, or other types of computation or communication devices. Network 140 may include a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

CPE management server 150 may include one or more server devices, or other types of computation or communication devices, that gather, process, search, store, and/or provide information in a manner similar to that described herein. CPE management server 150 may communicate via network 140. In one example implementation, CPE management server 150 may host a load balancing application that may perform load balancing operations and/or handover operations within environment 100, in order to ensure that CPE device 110 receives traffic that complies with a target GOS. In one example, the load balancing application receive information, associated with CPE device 110, that includes metrics, such as an ordered set of cell identifiers that correspond to cells via which CPE device 110 is able to communicate with network 140. In another example, the metrics may include base station identifiers, signal strength values, signal quality values, etc. The load balancing application may use the information to balance traffic loads between base stations 130 and/or corresponding cells in order to ensure that CPE device 110 can receive and/or transmit traffic that meets or exceeds the target GOS.

CPE management server 150 may monitor traffic conditions associated with devices within network 140 and/or base stations 130 to determine a quantity of traffic (e.g., traffic loading) being processed by the devices and/or base stations 130. The load balancing application may identify an available loading capacity (e.g., a quantity of additional traffic that a device may process before congestion occurs and/or packets begin to be dropped) associated with the devices and/or base stations 130 based on the monitoring. The load balancing application may use the traffic loading and/or available loading capacity (e.g., associated with each device and/or base station 130) to determine whether a load balancing operation is triggered. For example, the load balancing application may cause a load balancing operation to be performed when a traffic load, associated with one or more devices and/or base stations 130, exceeds a threshold. In another example, the load balancing application may cause a load balancing operation to be performed when an available loading capacity, associated with one or more devices and/or base stations 130, is less than another threshold.

In yet another example, the load balancing application may use historical data and/or trend data, associated with traffic loading conditions within environment 100, to determine whether and/or when to perform a load balancing operation. For example, if base station 130 is processing traffic at or near capacity and the trend data indicates that the quantity of traffic is projected to increase, then the load balancing application may cause a load balancing operation to be performed by transferring a portion of the traffic from based station 130 to another base station 130 that has available loading capacity.

In still another example, the load balancing application may cause CPE management server 150 to send an instruction to one or more base stations 130 and/or to CPE device 110 to perform a handover from one cell to another cell when the load balancing application determines that transmitting the traffic to CPE device 110 via the other cell ensures that traffic is being received that satisfies a target GOS.

Application server 160 may include one or more server devices, or other types of computation or communication devices, that gather, process, search, store, and/or provide information in a manner similar to that described herein. Application server 160 may communicate via network 140. In one example implementation, application server 160 may provide applications, data, and/or services to CPE device 110. In one example implementation, application server 160 may be a web server that hosts a website from which CPE device 110 can receive applications, data, and/or services. In another example, application server 160 may be a content delivery server that provides broadcast video streams and/or Video on Demand (VoD) television content. In another example, application server 160 may provide information associated with traffic conditions (e.g., throughput, bandwidth, etc.) associated with applications, data, and/or services that can be used by CPE device 110.

Figure 2:
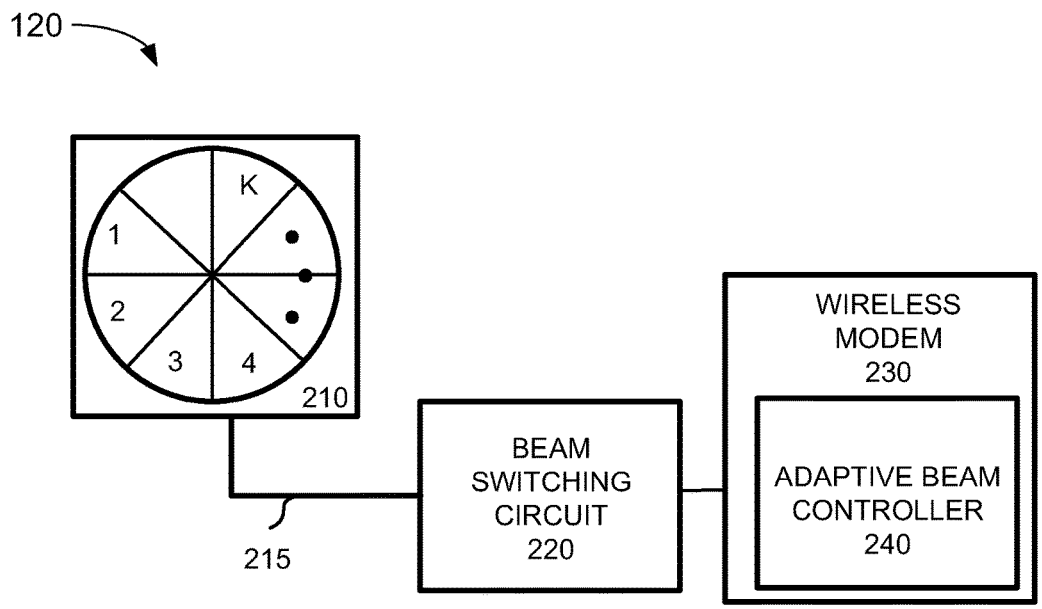
FIG. 2 is a diagram illustrating an example of components of an antenna unit depicted in FIG. 1.

FIG. 2 is a diagram illustrating example components of antenna unit 120 according to an implementation described herein. As shown in FIG. 2, antenna unit 120 may include a multiple beam antenna 210, an antenna wire assembly 215, a beam switching circuit 220, and a wireless modem 230.

Multiple beam antenna 210 may include multiple fixed passive antenna elements 1, 2, . . . , K (where K≥1). The antenna elements may transmit and/or receive traffic via one or more synthesized antenna beams. The synthesized antenna beams may be partially overlapping and each beam may be oriented to a different direction on an x-y plane (or a different plane), spanning a combined 360 degrees in azimuth. Each antenna element may transmit or receive in a manner that corresponds to an RF beam. Alternatively, or additionally, the antenna elements may be combined, via beam switching circuit 220, to synthesize narrower beams.

A particular beam, of multiple beam antenna 120, may support two receive diversities realized using polarization diversity. The polarizations may, in one example, be either horizontal or vertical or slant (+/−45 degrees) polarizations. In another example, another polarization may be used (e.g., right and/or left hand circular polarization, elliptical polarization, etc.). Under the LTE standard, an eNodeB may use two or more transmitters, where the transmitters may use vertical polarizations (for all transmitters), slant polarizations, or a combination of various polarizations and/or space diversities (which may rely on vertical polarization). In one implementation, a particular beam may require only a single transmitter path for CPE device 110. In another implementation, a particular beam may require multiple transmitter paths (e.g., two transmitter paths) for CPE device 110.

Antenna wire assembly 215 may connect multiple beam antenna 210 to beam switching circuit 220, and may include a separate connection for each element of multiple beam antenna 210. Beam switching circuit 220 may select a particular beam of multiple beam antenna 210. For example, beam switching circuit 220 may select one of beams 1-K. Beam switching circuit 220 may combine inputs and/or outputs from different beams of multiple beam antenna 210 to synthesize a new beam that points in a particular direction on the x-y plane in which beams of multiple beam antenna 210 are located.

Wireless modem 230 may include a RF receiver that receives signals from multiple beam antenna 210 and performs signal processing on the received signals before providing the received signals to CPE device 110. Wireless modem 230 may also include a RF transmitter that receives signals to be transmitted wirelessly and performs signal processing on the signals before providing the signals to multiple beam antenna 210. For example, wireless modem 230 may perform analog-to-digital and digital-to-analog conversion, modulation and demodulation, up-conversion and down-conversion, and/or amplification of signals.

Wireless modem 230 may include an adaptive beam controller 240. Adaptive beam controller 240 may scan beams of multiple beam antenna 210 by controlling beam switching circuit 220. Adaptive beam controller 240 may collect one or more metrics associated with the beams based on signals received via the beams. In one example, adaptive beam controller 240 may select a best beam based on metrics collected for the beams of multiple beam antenna 210.

Adaptive beam controller 240 may compute thresholds for particular metrics associated with beams of multiple beam antenna 210. Adaptive beam controller 240 may compute the thresholds based on various parameters, such as marketing requirements (e.g., a target GOS based on a tier of service subscribed to by a user of CPE device 110) or requirements associated with particular applications of CPE device 110 (e.g., a required video streaming rate). Adaptive beam controller 240 my store the computed thresholds, the various parameters, such as the target GOS, the marketing requirements, etc., in a memory associated with adaptive beam controller 240 and/or antenna unit 120.

Adaptive beam controller 240 may monitor a SINR and/or some other metric (e.g., RSRP, RSRQ, etc.) of a currently serving beam and may trigger a beam scan if the SINR falls below a threshold associated with the SINR. Adaptive beam controller 240 may identify another serving beam when a SINR associated with the other beam is greater than the threshold and adaptive beam controller 240 may select the other beam as the serving beam. In another example, adaptive beam controller 240 may, in response to an instruction from CPE management server 150, cause a handover operation to be performed, which may cause antenna unit 120 to change from a beam associated a particular serving cell and/or base station 130 to another beam associated with another serving cell and/or another base station 130.

In another example, adaptive beam controller 240 may rank cells and/or base stations 130 based on metrics collected with respect to the beams of multiple beam antenna 120. Adaptive beam controller 240 may, for example, identify cells and/or base stations 130 from which traffic is received and may generate an ordered list of identifiers, associated with the identified cells and/or base stations 130, based on the metrics. Adaptive beam controller 240 may, for example, generate the ordered list of identifiers based on a metric, such as a measured SINR value, associated with signals received from each of the cells and/or base stations 130 (e.g., in descending order from highest to lowest SINR, in an ascending order, or some other order). Alternatively, or additionally, the ordered list of cell identifiers and/or base stations 130 identifiers may correspond to other metrics, such as RSRP, throughput (e.g., data rate), RSRQ, channel quality, channel isolation, etc.

In yet another example, adaptive beam controller 240 may determine from which cells and/or base stations 130 traffic is being received that satisfies a target GOS associated with CPE device 110. Adaptive beam controller 240 may store thresholds associated with the target GOS, such as a SINR threshold, a RSRP threshold, a RSRP threshold, a data rate threshold, a channel quality threshold, and/or other thresholds). Adaptive beam controller 240 may use one or more of the thresholds to determine which cells and/or base stations 130 are transmitting traffic that complies with the target GOS. In one example, adaptive beam controller 240 may compare a threshold (e.g., a SINR threshold corresponding to the target GOS) with metrics associated with each cell and/or base station 130 (e.g., a SINR metric) to determine from which cells and/or base stations 130 traffic is being received that complies with the target GOS. Adaptive beam controller 240 may select cells and/or beams associated with the metric that is greater than the threshold and may send an ordered (e.g., ranked) list of identifiers and/or metrics, to CPE management server 150, that corresponds to the selected cells and/or base stations 130.

Although FIG. 2 shows example components of antenna unit 120, in other implementations, antenna unit 120 may include fewer components, different components, differently arranged components, or additional components than depicted in FIG. 2. Additionally or alternatively, one or more components of antenna unit 120 may perform the tasks described as being performed by one or more other components of antenna unit 120 and/or CPE 110. For example, adaptive beam controller 240 may be included in CPE 110 in addition to and/or instead of antenna unit 120.

Figure 3:
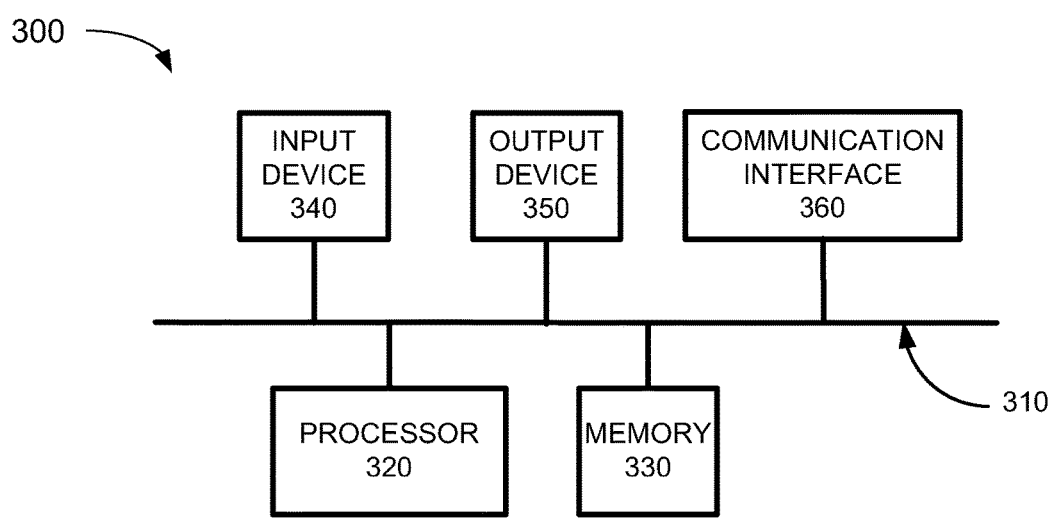
FIG. 3 is a diagram illustrating an example of components of one or more devices as illustrated in FIG. 1.

FIG. 3 is a diagram illustrating example components of device 300 that may correspond to CPE device 110, CPE management server 150, application server 160, and/or adaptive beam controller 240. Each of CPE device 110, CPE management server 150, application server 160, and/or adaptive beam controller 240 may include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to device 300, such as a keypad, a button, a pen, a touch screen, voice recognition and/or biometric mechanisms, etc. Output device 350 may include a mechanism that outputs information to the operator, including a display, one or more light emitting diodes (LEDs), a speaker, etc.

Communication interface 360 may include any transceiver-like mechanism that enables device 300 to communicate with other devices and/or systems, such as for communicating with base stations 130, or with network 140 via base stations 130. For example, communication interface 360 may include a modem, a network interface card, or a wireless interface card.

As will be described in detail below, device 300 may perform certain operations associated with a load balancing operation. Device 300 may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, additional components, or differently arranged components than depicted in FIG. 3. Additionally, or alternatively, one or more components of device 300 may perform one or more tasks described as being performed by one or more other components of device 300.

FIG. 4A is a diagram of example data structure 400 that can be used by antenna unit 120. In one implementation, one or more data structures 400 may be stored in a storage device included as part of memory 330 of adaptive beam controller 240. For example, a different data structure 400 may be stored for each beam, of multiple beam antenna 210, in the storage device.

In another implementation, data structure 400 may be stored in a memory associated with another device or a group of devices, separate from or including memory 330 of adaptive beam controller 240.

As shown in FIG. 4A, data structure 400 may include a beam identifier (ID) field 405, a base station identifier (ID) field 410, a serving cell identifier (ID) field 415, a signal-to-interference noise ratio (SINR) field 420, a reference signal received power (RSRP) field 425, a reference signal received quality (RSRQ) field 430, a channel rank/channel quality index (CQI) field 435 (hereinafter referred to as "channel quality field 435"), and a throughput field 440.

Beam ID field 405 may store an identifier associated with a particular beam of multiple beam antenna 210. Serving cell field 415 may store an identifier that corresponds to a serving cell via which the particular beam is receiving and/or transmitting traffic. Base station ID field 410 may store an identifier associated with a particular base station 130 with which the serving cell is associated. For example, if the particular beam is able to receive signals from more than one base station 130 and/or cells, serving cell field 415 may store an identifier associated with a preferred base station 130 and/or a preferred serving cell associated with the strongest signal.

SINR field 420 may store a SINR value associated with the particular beam. The SINR value may indicate a ratio of signal power to interference plus noise power corrupting the signal. The SINR value may be measured from signals received by a particular cell of a particular base station, called the serving cell of the particular beam. If the particular beam is able to receive signals from more than one cell, a particular cell may be selected as the serving cell. For example, a cell associated with signals received at the highest signal strength may be designated as the serving cell of the particular beam. Alternatively, or additionally, SINR field 420 may store a signal to noise ratio (SNR) and/or a signal to noise plus distortion ratio (SNDR) associated with the particular beam.

RSRP field 425 may store a RSRP value associated with the particular beam. The RSRP value may relate to signal strength of signals received from the serving cell and may be defined as a linear average of the received power of resource elements that carry cell-specific reference signals within a particular frequency bandwidth. The RSRP value may be computed by adaptive beam controller 240 based on reference signals received from the particular base station 130.

RSRQ field 430 may store a RSRQ value associated with the particular beam. The RSRQ value may relate to signal quality and may be defined as a ratio of RSRP to a carrier received signal strength indicator (RSSI). The carrier RSSI may be defined as a linear average of a total received power in orthogonal frequency division multiplexing (OFDM) symbols containing the reference symbols. The RSRQ value may be computed by adaptive beam controller 240 based on reference signals received from the particular base station 130.

Channel quality field 435 may store one or more values corresponding to channel rank and/or a CQI associated with the particular beam. A channel rank may correspond to a correlation between two channels transmitted by the serving cell of the particular beam, and may represent how independent the two channels are (e.g., may represent the orthogonality of the channels). Channel rank may be computed as the rank of the correlation matrix of the two channels. CQI may correspond to a measure of channel quality, and may be based on a SINR of the channel, a SNR of the channel, and/or a SNDR of the channel.

Throughput field 440 may store a throughput value associated with the particular beam. The throughput value may correspond to an average rate of successful downlink (or uplink) message delivery between the serving cell and the particular beam. Throughput may be measured in bits per second, packets per second, and/or packets per time slot. Additionally, throughput field 440 may store a value corresponding to a packet loss rate associated with the particular beam.

Although FIG. 4A shows example fields of data structure 400, in other implementations, data structure 400 may contain fewer fields, different fields, additional fields, or differently arranged fields than depicted in FIG. 4A. Additionally, or alternatively, one or more fields of data structure 400 may include information described as being included in one or more other fields of data structure 400.

Figure 4B:
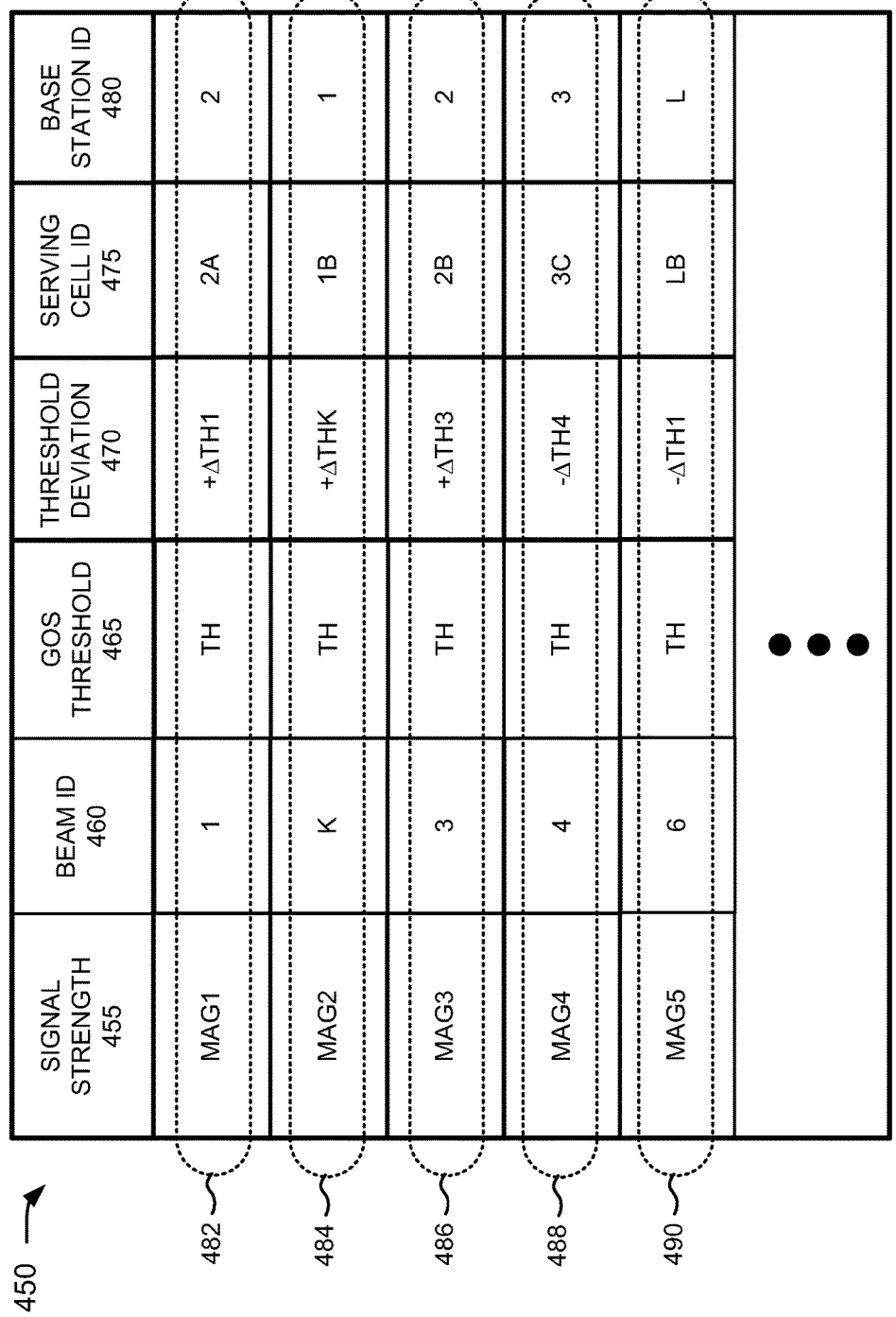

FIG. 4B is a diagram of example data structure 450 that can be used by antenna unit 120. In one implementation, data structure 450 may be stored in a storage device included as part of memory 330 of adaptive beam controller 240. In another implementation, data structure 400 may be stored in a memory associated with another device or a group of devices, separate from or including memory 330 of adaptive beam controller 240. Although FIG. 4B shows example fields of data structure 450, in other implementations, data structure 450 may contain fewer fields, different fields, additional fields, or differently arranged fields than depicted in FIG. 4B. Additionally or alternatively, one or more fields of data structure 450 may include information described as being included in one or more other fields of data structure 450.

As shown in FIG. 4B, data structure 450 may include a signal strength field 455, a beam identifier (ID) field 460, a grade of service (GOS) threshold field 465, a threshold deviation field 470, a serving cell identifier (ID) field 475, and a base station identifier (ID) field 480. Signal strength field 455 may store a value that corresponds to a quantity of signal strength associated with a particular beam of multiple beam antenna 210. In one example, a SINR value corresponding to the particular beam may be stored in signal strength field 455. In another example, a RSRQ value corresponding to the particular beam may be stored in signal strength field 455. In yet another example, other metrics associated with signal power, signal quality, and/or throughput (e.g., RSRP, RSRQ, SNR, SNDR, data rate, CQI, etc.) may be stored in signal strength field 455. Beam ID field 460 may store an identifier for the particular beam from which the quantity of signal power was measured by adaptive beam controller 240.

GOS threshold field 465 may store a threshold associated with a signal strength that corresponds to a target GOS associated with CPE device 110. In one example, adaptive beam controller 240 may store a threshold associated with a SINR value that corresponds to the target GOS. In another example, adaptive beam controller 240 may store a threshold associated with a RSRQ value that corresponds to the target GOS. In yet another example, adaptive beam controller 240 may store a threshold associated with another metric (e.g., RSRP, SNR, SNDR, data rate, CQI, etc.) that corresponds to the target GOS.

Threshold deviation field 470 may store a value that corresponds to a difference between the signal strength for the particular beam and the GOS threshold. For example, if the signal power is greater than the GOS threshold, then adaptive beam controller 240 may store a value that indicates that the signal power is greater than the GOS threshold (e.g., a positive value). In another example, if the signal power for the particular beam is less than the GOS threshold, adaptive beam controller 240 may store another value that indicates that the signal power is less than the GOS threshold (e.g., a negative value).

Serving cell ID field 475 may store an identifier for a cell from which the quantity of signal strength, associated with the particular beam, is measured. Base station ID field 480 may store an identifier for base station 130 with which the serving cell is associated.

Data structure 450 may store metrics in a particular order based on the quantity of signal strength associated with the beams. For example, adaptive beam controller 240 may store metrics, associated with the strongest signal strength (e.g., MAG1), in a first set of entries within data structure 450 (e.g., as shown by ellipse 482). The metrics may include a beam ID (e.g., 1) from which the strongest signal strength is measured, a GOS threshold (e.g., TH), and/or a threshold deviation (e.g., a positive threshold deviation, such as +$\Delta$TH1), which identifies a quantity by which the signal strength is greater than the GOS threshold (e.g., according to the formula $\Delta TH = MAG - TH$) (e.g., as shown by ellipse 482). Adaptive beam controller 240 may store a serving cell ID (e.g., 2A) associated with a cell from which the strongest signal strength was received and/or an identifier associated with base station 130 (e.g., 2) with which the serving cell is associated (e.g., as shown by ellipse 482).

As further illustrated by FIG. 4B, data structure 450 may store metrics for other beams, in the particular order, based on the quantity of signal strength. For example, adaptive beam controller 240 may store metrics, associated with the second strongest signal strength (e.g., MAG2) corresponding to another threshold deviation (e.g., a positive threshold deviation, such as +$\Delta$THK), in a second set of entries within data structure 450 (e.g., as shown by ellipse 484). Adaptive beam controller 240 may store other metrics in descending order of signal strength (e.g., MAG3, . . . , MAG5, etc.) (e.g., as shown by ellipses 486-490) until metrics, associated with a beam via which the weakest signal power is received, are stored in a last set of entries within data structure 450 (not shown in FIG. 4B). In one example, adaptive beam controller 240 may store metrics associated with a quantity of signal strength (e.g., MAG4, MAG5) that is less than the GOS threshold (e.g., TH) (e.g., as shown by ellipses 488 and 490). Adaptive beam controller 240 may store a corresponding threshold deviation (e.g., a negative threshold deviation, such as −$\Delta$TH4, −$\Delta$TH1, etc.), which indicates that there is a shortfall in signal strength associated with a particular beam identifier (e.g., 4, 6) (e.g., as shown by ellipses 488 and 490).

Figure 5:
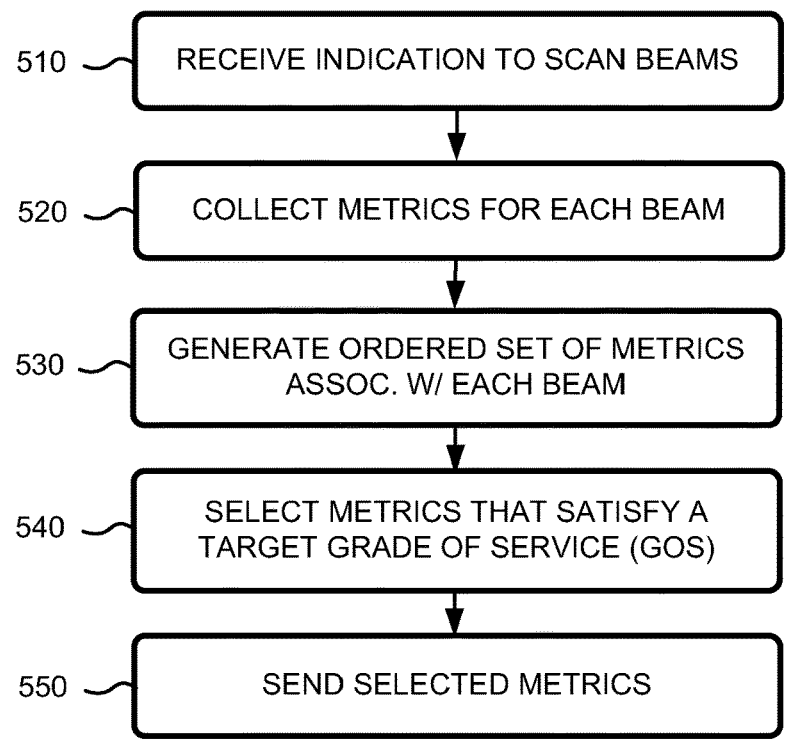
FIG. 5 is a flow diagram illustrating an example process for identifying and/or ordering cells from which traffic that satisfies a target GOS is received.

FIG. 5 is a flow diagram illustrating an example process 500 for identifying and/or ordering cells from which traffic is received that satisfies a target GOS. In one implementation, process 500 may be performed by antenna unit 120. In other implementations, some or all of process 500 may be performed by another device or a group of devices separate from or including antenna unit 120.

As shown in FIG. 5, process 500 may include receiving an indication to scan beams (block 510). For example, adaptive beam controller 240 may initiate an operation to scan beams of multiple beam antenna 210 based on an indication that the beams are to be scanned. The indication may be generated periodically (e.g., at a particular time interval), at a particular point in time (e.g., a time of day, etc.), and/or at a random point in time (e.g., when a random number matches a particular number) based on software (e.g., pre-programmed during manufacture or by a network administrator) and/or hardware associated with adaptive beam controller 240. In another example, adaptive beam controller 240 may scan the beams when a user of CPE device 110 manually triggers the operation via CPE device 110 (e.g., when the user presses a button or a series of buttons on CPE device 110 or another device that controls CPE device 110). In yet another example, adaptive beam controller 240 may initiate the operation based on an instruction, to scan the beams, that is received from CPE management server 150.

As also shown in FIG. 5, process 500 may include collecting metrics for each beam (block 520). For example, adaptive beam controller 240 may send an instruction to beam switching circuit 220 to select one of the beams (e.g., one of beams 1 through K) of multiple beam antenna 210. Switching circuit 220 may receive the instruction and may select a first beam (e.g., beam 1) from which a signal is to be measured in order to collect metrics associated with the beam. Adaptive beam controller 240 may receive the signal and may collect one or more metrics for the first beam and store the collected metrics in a memory associated with antenna unit 120 (e.g., as data structure 400 of FIG. 4A). Adaptive beam controller 240 may repeat the operation for each of the other beams (e.g., beams 2 through K) and may store the metrics for each of the other beams in the memory.

As further shown in FIG. 5, process 500 may include generating an ordered set of metrics associated with each beam (block 530). For example, antenna unit 120 may sort and/or arrange the metrics obtained from each beam into a particular order (e.g., an ascending order, a descending order, or some other order) based on a signal strength metric obtained from the beams. In one example, the signal strength metric may be an SINR associated with the beam and antenna unit 120 may sort the metrics into an ordered set of metrics from strongest SINR (e.g., greatest quantity of SINR) to weakest SINR (e.g., lowest quantity of SINR). In another example, the set of metrics may be sorted into an ordered set of metrics based on a RSRQ metric (e.g., from greatest quantity of RSRQ to lowest quantity of RSRQ). In yet another example, the set of metrics may be sorted into an ordered set of metrics based on another signal strength metric, such as a metric based on signal power (e.g., RSRP, SNR, SNDR, etc.), signal quality (e.g., CQI, channel rank, etc.), throughput (e.g., data rate), quality of service (e.g., quantity dropped and/or delayed packets etc.), and/or some combination thereof.

For example, the set of metrics may be sorted into an ordered set of metrics based on a throughput (e.g., a data rate) and/or channel correlation (e.g., channel rank) associated with the beams. Traffic being transmitted via a beam, with a low channel rank value, may be associated with higher throughput as compared to traffic being transmitted via a beam with a high channel rank value. If a channel rank is low, each transmitter of the serving cell may transmit a different bit stream on each channel. If a channel rank is high, transmit diversity may need to be employed, meaning that the same bits are transmitted on multiple channels.

In yet another example, the set of metrics may be sorted into an ordered set of metrics based on a combination of metrics. For example, a channel rank value, and a SINR and/or RSRQ value may be used to sort the set of metrics. For example, a beam with a low channel rank and/or high SINR (e.g., and/or high RSRQ) may be ranked higher than a beam with a high channel rank and/or a low SINR and/or RSRQ.

Antenna unit 120 may retrieve (e.g., from a memory associated with antenna unit 120) a target GOS threshold associated with the metric used to sort the set of metrics) and may store the ordered set of metrics, including the target GOS threshold, in the memory (e.g., as data structure 450 of FIG. 4B). In one example implementation, a GOS threshold may be preconfigured in memory during manufacture (or programming) of adaptive beam controller 240 or may be downloaded by adaptive beam controller 240 from a device in network 140. In another example implementation, adaptive beam controller 240 may compute GOS thresholds from particular marketing requirements (e.g., a guaranteed throughput rate associated with a tier of service), requirements associated with particular applications, and/or services requested by a user of CPE device 110.

As yet further shown in FIG. 5, process 500 may include selecting metrics that satisfy a target GOS (block 540). For example, antenna unit 120 may select a portion of the ordered set of metrics associated with a beam that receives traffic that complies with the target GOS. In one example, antenna unit 120 may determine that a portion of the ordered set of metrics (e.g., corresponding to ellipses 482-486 of FIG. 4B) include signal powers (e.g., SINR values, such as MAG1, MAG2, and MAG3) that are greater than the target GOS threshold (e.g., TH) as indicated by the threshold deviations (e.g., positive threshold deviations $+\Delta TH1$, $+\Delta THK$, and $+\Delta TH3$) associated with the signal strengths.

In another example, antenna unit 120 may select a portion of the ordered set of metrics based on a signal quality that satisfies the target GOS. For example, antenna unit 120 may use a RSRQ and/or CQI value obtained from each beam to perform a look up (e.g., using a table that includes RSRQ values that correspond to SINR values) to identify a SINR value that corresponds to the RSRQ value. Antenna unit 120 may use the SINR value for each beam to select the portion of the ordered set of metrics that satisfy the target GOS threshold. In yet another example, antenna unit 120 may select a portion of the ordered set of metrics based on throughput values (e.g., data rate values) that are greater than the target GOS threshold that is based on a particular throughput value.

In still another example, antenna unit 120 may select a portion of the ordered set of metrics based on a channel rank value and/or a quantity of signal strength (e.g., as measured by SINR, RSRQ, RSRP, SNR, SNDR, etc.) that satisfies a target GOS threshold. Antenna unit 120 may, for example, generate a score, based on a channel rank and/or a quantity of signal strength, obtained from each beam. Antenna unit 120 may select a portion of the ordered set of metrics based on a determination that the score, associated with the portion of the ordered set of metrics, is greater than the GOS threshold. In yet another example, antenna unit 120 may use the score to perform a look up (e.g., using a table that includes scores that correspond to SINR values) to identify a SINR value that corresponds to the score. Antenna unit 120 may use the corresponding SINR value for each beam to select the portion of the ordered set of metrics that satisfy the target GOS threshold (e.g., a target GOS threshold based on a SINR value).

As still further shown in FIG. 5, process 500 may include sending selected metrics (block 550). For example, antenna unit 120 may send all or some of the selected ordered set of metrics to CPE management server 150. In one example, antenna unit 120 may send the selected ordered set of metrics (e.g., as shown by ellipses 482-486 of FIG. 4B) to CPE management server 150. Antenna unit 120 may, for example, send the selected ordered set of metrics to CPE management server 150 using a CPE WAN management protocol (CWMP) (e.g., based on Broadband Forum's Technical Report (TR)-069). In another example, antenna unit 120 may send a portion of the selected ordered set of metrics that includes the cell identifiers that correspond to cells that are transmitting traffic, to CPE device 110, with signal strengths that satisfy the target GOS. In another example implementation, antenna unit 120 may send all or a portion of the selected ordered set of metrics and metrics associated with beams with signal strengths that do not comply with the target GOS.

FIG. 6 is a diagram of an example data structure 600 that may be used to perform a load balancing operation. In one implementation, data structure 600 may be stored in a storage device included as part of memory 330 of CPE management server 150. In another implementation, data structure 600 may be stored in a memory associated with another device or a group of devices, separate from or including memory 330 of CPE management server 150. As shown in FIG. 6, data structure 600 may include a base station identifier (ID) field 605, a cell identifier (ID) field 610, a loading condition field 615, and a reserve capacity field 620.

Although FIG. 6 shows example fields of data structure 600, in other implementations, data structure 600 may contain fewer fields, different fields, additional fields, or differently arranged fields than depicted in FIG. 6. Additionally, or alternatively, one or more fields of data structure 600 may include information described as being included in one or more other fields of data structure 600.

Base station ID field 605 may store an identifier associated with a particular base station 130 with which one or more cells are associated that transmit traffic to and/or receive traffic from CPE device 110. Cell ID field 610 may store an identifier for a particular cell, associated with the particular base station 130, via which traffic is transmitted to and/or received from CPE device 110. Loading condition field 615 may store information associated with a quantity of traffic being processed, received and/or transmitted via the particular cell. For example, CPE management server 150 may store an instantaneous quantity of bandwidth, a quantity of packets, an instantaneous throughput and/or data rate, etc. associated with traffic being transmitted via the particular cell. Reserve capacity field 620 may store information associated with a reserve capacity of the particular cell. For example, CPE management server 150 may store a quantity of additional traffic (e.g., additional bandwidth, additional quantity of packets, additional throughput, etc.) that the particular cell is capable of handling.

For example, CPE management server 150 may receive information associated with CPE device 110 from antenna unit 120 (e.g., via network 140). The information associated with CPE device 110 may include an ordered set of metrics (e.g., as shown by ellipses 482-486 of FIG. 4B) associated with traffic, being received by CPE device 110, that satisfies a target GOS associated with CPE device 110. CPE management server 150 may, in response to receiving the ordered set of metrics, communicate with base stations 130 to obtain information associated with traffic loading conditions at a present point in time for each base station 130 and/or each cell associated with base stations 130. For example, CPE management server 150 may store information associated with traffic loading conditions associated with a particular base station 130 (e.g., associated with an identifier of 1) that includes an identifier for each cell (e.g., cell 1A and 1B) associated with the particular base station 130 (e.g., as shown by ellipses 630 and 632). CPE management server 150 may also store a value associated with a loading condition for each cell (e.g., TRAF1A and TRAF1B) and/or another value associated with a reserve capacity (e.g., CAP1A and CAP1B) for the particular base station apportioned between each cell (e.g., as shown by ellipses 630 and 632).

Additionally, or alternatively, CPE management server 150 may store other information associated with loading conditions for other bases stations 130 and/or cells (e.g., as shown by ellipses 634 through 640). CPE management server 150 may use the information associated with the traffic loading conditions, stored in data structure 600, to ensure that CPE device 110 continues to receive traffic in a manner that satisfies the target GOS. More particularly, CPE management server 150 may use the information associated with traffic loading conditions to determine whether and/or the manner in which to perform a traffic load balancing operation and/or a handover operation. CPE management server 150 may perform the load balancing operation and/or handover operation to ensure that traffic is sent to CPE device 110 in a manner that complies with the target GOS. For example, the load balancing operation may be performed to ensure that one or more of the cells that are identified in the ordered set of metrics (e.g., cells 2A, 1B, and 2B, which correspond to ellipses 634, 632, and 636, respectively) are capable of transporting the target GOS-compliant traffic to CPE device 110.

Figure 7:
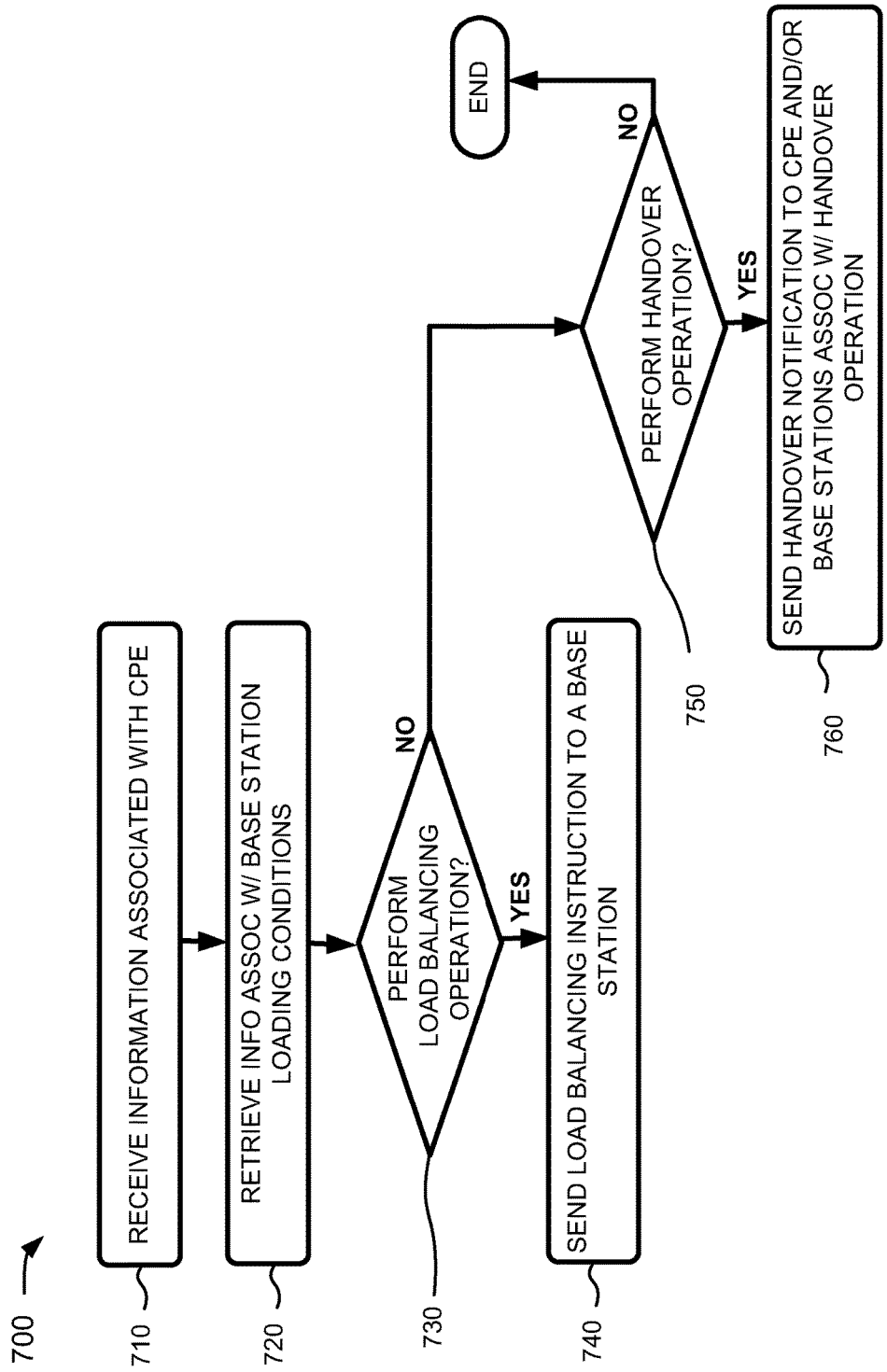
FIG. 7 is a flow diagram illustrating an example process for performing a load balancing operation according to an implementation described herein.

FIG. 7 is a flow diagram illustrating an example process 700 for performing a load balancing operation according to an implementation described herein. In one implementation, the process of FIG. 7 may be performed by CPE management server 150. In other implementations, some or all of the process 700 may be performed by another device or a group of devices separate from or including CPE management server 150.

As shown in FIG. 7, process 700 may include receiving information associated with CPE device 110 (block 710) and retrieving information associated with base station 130 loading conditions (block 720). For example, antenna unit 120 may generate an ordered set of metrics associated with cells via which GOS-compliant traffic is being received. The ordered set of metrics may include all or a portion of the ordered set of metrics stored within the memory of antenna unit 120 (e.g., as data structure 450 of FIG. 4B). Antenna unit 120 may send the ordered set of metrics to CPE management server 150. CPE management server 150 may receive the ordered set of metrics and a load balancing application, hosted by CPE management server 150, may communicate with base stations 130 to obtain information associated with a loading condition for each base station 130. In one example, the information associated with the loading condition may include a quantity of traffic (e.g., an instantaneous bandwidth, and instantaneous data rate, a quantity of packets, etc.) being transmitted via one or more cells associated with base station 130. In another example, the information associated with the loading condition may include a reserve capacity (e.g., an additional quantity of traffic) that base station 130 is capable of processing before becoming congested, which may result in delaying and/or dropping packets. The load balancing application may store the information associated with the loading condition for each base station 130 in a memory associated with CPE management server 150 (e.g., as data structure 600 of FIG. 6).

In another example implementation, the load balancing application may retrieve (e.g., from a memory associated with CPE management server 150) historical information, associated with base station 130 loading conditions, from a prior point in time. The historical information may include information associated with loading conditions as a function of time. For example, the historical information may include information associated peak traffic flow (e.g., throughput, bandwidth, packet quantity, etc.) during a period of time (e.g., during business hours) and/or information associated with low traffic flow during another period of time (e.g., during non-business hours, weekends, etc.).

The load balancing application may use the ordered set of metrics received from antenna unit 120 and/or the information associated with the loading conditions for base stations 130 to determine whether to perform a load balancing operation to ensure that CPE device 110 receives traffic that satisfies a target GOS. Additionally, or alternatively, the load balancing application may use the historical information to determine whether to perform the load balancing operation.

As further shown in FIG. 7, if a load balancing operation is to be performed (block 730—YES), then process 700 may include sending a load balancing instruction to base station 130 (block 740). For example, a load balancing application may determine that a load balancing operation is to be performed based on the metrics received from antenna unit 120 and/or the information associated with the loading conditions of base stations 130. In one example, the load balancing application may determine that a particular cell (e.g., cell 2A), associated with a particular base station 130 (e.g., with a base station ID of 2), via which CPE device 110 receives traffic, is congested and/or has otherwise reached capacity (e.g., as shown by ellipse 634 of FIG. 6). The load balancing application may determine, for example, that the particular base station 130 and or the particular cell is congested when a quantity of traffic (e.g., TRAF2A) is greater than a congestion threshold and/or when a reserved capacity (e.g., CAP2A) is less than a capacity threshold (e.g., as shown by ellipse 634). When the particular base station 130 and/or the particular cell are determined to be congested, the load balancing application may initiate a load balancing operation to reduce a probability that traffic, destined for CPE device 110, may be disrupted (e.g., due to delayed and/or dropped packets) and/or to avoid a degradation in throughput associated with the traffic.

In another example, the load balancing application may determine that the particular base station 130 and/or the particular cell are not congested and may determine that a load balancing operation may be performed at a future point in time based on the historical information. For example, the load balancing application may determine that the traffic conditions associated with the particular base station 130 and/or the particular cell may degrade and/or become congested, at a future point in time (e.g., during business hours), based on historical information, associated with the particular base station 130 and/or the particular cell, that indicates that the traffic condition may degrade and/or become congested at the future point in time. Based on the determination, the load balancing application may schedule a load balancing operation at the future point in time.

In yet another example, when making a determination to perform the load balancing operation, the load balancing application may consider a margin (e.g., based on a threshold deviation, +ΔTH1, as shown by ellipse 482 of FIG. 4B) associated with the traffic being received by CPE device 110 via the particular cell. If, for example, the quantity of margin is less than a threshold, the load balancing application may perform the load balancing operation and/or may schedule the load balancing operation at a future point in time. More particularly, if a degradation in traffic condition (e.g., by a quantity of throughput, signal strength, signal quality, etc.) causes and/or is projected to cause (e.g., by the future point in time) the received traffic to fall below the target GOS, then the load balancing application may perform or may schedule the load balancing operation prior to the future point in time.

In still another example, when making a determination to perform the load balancing operation, the load balancing application may communicate with application server 160 to identify bandwidth and/or throughput requirements associated with applications, television content, services, etc. that are used by CPE device 110. For example, the load balancing application may determine that traffic throughput, signal strength, signal quality, etc. associated with CPE device 110, at the present point in time, may increase to a point that the traffic no longer complies with the target GOS based on the bandwidth and/or throughput requirements associated with the applications, television content, services, etc. used by CPE device 110. Alternatively, or additionally, when determining the traffic throughput, signal strength, signal quality, etc., of traffic being received by CPE device 110, the load balancing application may consider the overhead traffic associated with CPE device 110 (e.g., the additional traffic associated with monitoring and/or controlling CPE device 110, such as traffic associated with metrics, instructions, notifications, etc.).

Based on a determination that the load balancing operation is to be performed, the load balancing application may send a load balancing instruction to one or more base stations 130. The instruction may include, for example, an indication that a portion of the traffic (e.g., traffic not destined for CPE device 110) being sent to the particular base station 130 is to be rerouted to another base station 130 associated with a reserve capacity that is greater than the capacity threshold. In one example, the instruction may be sent at a point in time that the determination to perform the load balancing operation was made. In another example, the instruction may be sent at a later point in time (e.g., when the load balancing operation is scheduled to be performed). The one or more base stations 130 may receive the instruction and may reroute the traffic to another base station 130. The rerouted traffic may be supported by a low-latency interface (e.g., an X2 interface), that enables high speed communications (e.g., associated with a data rate that is greater than a threshold) and signaling between base stations 130 to dynamically reroute traffic, to the other base station 130, as part of a load balancing operation.

As still further shown in FIG. 7, if a load balancing operation is not to be performed (block 730—NO) and if a handover operation is to be performed (block 750—YES), then process 700 may include sending a handover notification to CPE 110, antenna unit 120, and/or base stations 130 associated with the handover operation (block 760). For example, the load balancing application may determine that load balancing operation is not to be performed based on the metrics received from antenna unit 120 and/or the information associated with loading conditions of base stations 130. In one example, the load balancing application may determine that particular cells (e.g., cell 2A, 1B, and/or 2B), associated with particular base stations 130 (e.g., with a base station IDs of 1 and 2), via which CPE device 110 receives traffic, are not congested and/or have not reached capacity (e.g., as shown by ellipses 632-636 of FIG. 6). The load balancing application may determine, for example, that the particular base stations 130 and or the particular cells are not congested when a quantity of traffic (e.g., TRAF2A, TRAF1B, and/or TRAF2B) are less than the congestion threshold and/or when a reserved capacity (e.g., CAP2A, CAP1B, and/or CAP1B) are greater than the capacity threshold (e.g., as shown by ellipses 632-636). When the particular base stations 130 and/or the particular cells are determined not to be congested, the load balancing application may not initiate a load balancing operation.

In another example, the load balancing application may use the historical information, associated with the particular base stations 130 and/or the particular cells to determine that a load balancing operation is not to be performed at a future point in time. For example, the load balancing application may determine that the traffic conditions associated with the particular base stations 130 and/or the particular cells are not projected to degrade below a threshold at a future point in time based on the historical information. More particularly, the load balancing application may determine that the traffic conditions are not projected to degrade to a point that the traffic, received by CPE device 110, does not comply with the target GOS at the future point in time (e.g., during business hours, peak traffic hours, etc.).

Alternatively, or additionally, when making the determination not to perform the load balancing operation, the load balancing application may consider a margin relative to the target GOS (e.g., based on a threshold deviation, +ΔTH1, +ΔTHK, and +ΔTH3 as shown by ellipses 482-486 of FIG. 4B) associated with the traffic being received, by CPE device 110 via the particular cells. If, for example, the margin is greater than a threshold, the load balancing application may not perform the load balancing operation and/or may delay the load balancing operation until a future point in time. More particularly, if a degradation in traffic conditions (e.g., by a quantity of throughput, signal strength, signal quality, etc.) does not cause and/or is not projected to cause (e.g., by the future point in time) the received traffic to fall below the target GOS, then the load balancing application may not perform or may delay the load balancing operation until the future point in time.

The load balancing application may determine that a handover operation is to be performed when a particular base station 130 and/or a particular cell associated with the particular base station 130 from which CPE device 110 receives traffic, have not reached capacity, but are not, or will not be capable of carrying GOS-compliant traffic. This may occur, for example, when the particular base station 130 is malfunctioning, when the path loss between the particular base station 130 and antenna unit 120 is greater than a threshold (e.g., due to environment factors, obstructions, interference from external sources, etc.). Assume that the load balancing application determines that traffic conditions, associated with the particular base station 130 and/or the particular cell, are not congested or are not projected to be congested within a particular period of time. The load balancing application may identify, based on the metrics received from antenna unit 120, that the margin, associated with the traffic being received by CPE device 110 via the particular cell, is below a threshold. Based on the identification that the margin is below the threshold, the load balancing application may determine that a handover operation from the particular cell to another cell may be performed. In one example, the load balancing application may communicate with application server 160 to identify bandwidth and/or throughput requirements associated with applications, television content, services, etc. that are used by CPE device 110 to determine whether to perform the handover operation. For example, the load balancing application may determine that traffic throughput, signal strength, signal quality, etc. associated with CPE device 110, at the present point in time, may increase to a point that the traffic no longer complies with the target GOS based on the bandwidth and/or throughput requirements associated with the applications, television content, services, etc. used by CPE device 110. Alternatively, or additionally, when determining the traffic throughput, signal strength, signal quality, etc., the load balancing application may consider the overhead traffic associated with CPE device 110 (e.g., the additional traffic associated with monitoring and/or controlling CPE device 110, such as traffic associated with metrics, instructions, notifications, etc.).

Based on the determination that a handover operation is to be performed, the load balancing application may send a notification to CPE 110, antenna unit 110, and/or base stations 130 associated with the handover operation. In one example, the load balancing application may identify another cell (e.g., with an identifier of 2B as shown by ellipse 486 of FIG. 4B) associated with the particular base station 130 (e.g., identified from the metrics received from CPE server 110) is capable of carrying traffic that is currently being carried by the particular cell (e.g., with an identifier of 2A as shown by ellipse 486). The identification may be based on the margin (e.g., based on the threshold deviation of +ΔTH3 as shown by ellipse 486) associated with the traffic being carried by the other cell relative to the target GOS. Based on the identification of the other cell, the load balancing application may send a handover notification (e.g., an intra-base station handover notification) to CPE 110, antenna unit 120, and/or the particular base station 130 that an intra-base station handover operation is to be performed (e.g., which identifies the other cell). In one example, the notification may be sent using a CPE WAN management protocol (CWMP) based on the Broadband Forum's TR-069. The notification may be received by the particular base station 130 and the particular base station 130 may cause the traffic, destined for CPE device 110 via the particular cell, to be transmitted via the other cell. Alternatively, or additionally, antenna unit 120 may receive the notification and may cause antenna unit 120 to receive the traffic via a beam that corresponds to the other cell.

In another example, the load balancing operation may determine that a cell associated with the particular base station does not have the margin to carry the traffic that is being carried via the particular cell (e.g., with the identifier of 2A). The load balancing application may, for example, identify another cell (e.g., with an identifier of 1B as shown by ellipse 484 of FIG. 4B), associated with another base station 130 (e.g., with an identifier of 1), that is capable of carrying the traffic. The identification may be based on the margin (e.g., based on the threshold deviation of +ΔTHK as shown by ellipse 484) associated with traffic being carried by the other cell relative to the target GOS. Based on the identification of the other cell, the load balancing application may send a notification (e.g., an inter-base station handover notification) to CPE 110, antenna unit 120, the particular base station 130, and/or the other base station 130 that an inter-base station handover operation is to be performed. The inter-base station notification may include identifiers associated with the particular cell, the other cell, the particular base station 130, and/or the other base station 130. The notification may be received by the particular base station 130 and/or the other base station 130 and the particular base station 130 may cause the traffic, destined for CPE device 110 via the particular cell, to be transmitted to the other base station 130. The traffic may be transmitted via a low-latency and/or high throughput interface (e.g., an X2 interface). The other base station 130 may receive the traffic and may transmit the traffic to CPE device 110 via the other cell. Alternatively, or additionally, antenna unit 120 may receive the notification (e.g., based on a protocol associated with TR-069) and may cause antenna unit 120 to receive the traffic via a beam that corresponds to the other cell and/or the other base station 130.

As yet further shown in FIG. 7, if a load balancing operation is not to be performed (block 730—NO), and a handover operation is not to be performed (block 750—NO), then process 700 may end. For example, the load balancing application may determine that a load balancing operation is not to be performed based on the metrics received from antenna unit 120 and/or the information associated with the loading condition of base stations 130. In one example, the load balancing application may determine that cells and/or base stations 130 from which CPE device 110 receives traffic, are not congested and/or have not otherwise reached capacity. Based on the determination, the load balancing application may not perform a load balancing operation.

In another example, the load balancing application may determine that the cells and/or base stations 130 are not projected to be congested and/or otherwise reach capacity at a future point in time based on the historical information. Based on the determination, the load balancing application may not schedule a load balancing operation to be performed.

In yet another example, when making a determination not to perform the load balancing operation, the load balancing application may consider a margin (e.g., based on a threshold deviation) associated with the traffic being received, by CPE device 110 via each of the cells. If, for example, the quantity of margin is greater than a threshold, the load balancing application may not perform the load balancing operation and/or may not schedule the load balancing operation.

In still another example, when making a determination not to perform the load balancing operation, the load balancing application may communicate with application server 160 to identify bandwidth and/or throughput requirements associated with applications, television content, services, etc. that are used by CPE device 110. For example, the load balancing application may determine that traffic throughput, signal strength, signal quality, etc. associated with CPE device 110, at the present point in time, may not increase to a point that the traffic no longer complies with the target GOS based on the bandwidth and/or throughput requirements associated with the applications, television content, services, etc. used by CPE device 110. Alternatively, or additionally, when determining the traffic throughput, signal strength, signal quality, etc., of traffic being received by CPE device 110, the load balancing application may consider the overhead traffic associated with CPE device 110. Based on a determination that the load balancing operation is not to be performed, the load balancing application may not send a load balancing instruction to base stations 130.

The foregoing description of implementations provides illustration and description, but is not intended to be exhaustive or to limit the invention to the precise form disclosed. Modifications and variations are possible in light of the above teachings or may be acquired from practice of the invention.

For example, antenna unit 120 may include active components to minimize RF losses, improve link budgets, and/or provide additional capability to synthesize beams. Metrics may be collected for such synthesized beams and such synthesized beams may be selected in the beam selection process.

As another example, while series of blocks have been described with regard to FIGS. 5 and 7, the order of the blocks may be modified in other implementations. Further, non-dependent blocks may be performed in parallel.

As another example, while FIG. 2 illustrates a multiple beam antenna, other implementations may include a distributed antenna that includes beams located in multiple locations. For example, a distributed antenna may include a first beam at one location of a roof (e.g., the north side of a building), and a second beam at another location of the roof (e.g., the south side of the building).

As yet another example, while an implementation described herein relates to selecting a beam and/or a set of beams of a multiple beam antenna for receiving and transmitting signals, in another implementation, different beams may be selected for transmitting signals. Thus, a first set of beams may be selected for receiving signals based on a first set of metrics and a second set of beams may be selected for transmitting signals based on a second set of metrics.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a server device and from an antenna unit associated with a customer premises equipment (CPE) device, metrics associated with traffic that complies with a target grade of service (GOS), where the metrics include one or more cell identifiers that correspond to one or more cells via which the traffic is received by the CPE device;
retrieving, by the server device and as a result of receiving the one or more cell identifiers, information associated with traffic conditions within a plurality of base stations;
determining, by the server device, that a reserve capacity associated with a particular cell, of the one or more cells, associated with a base station, of the plurality of base stations, is less than a threshold,
where the reserve capacity is based on a quantity of traffic being transmitted via the particular cell and a maximum quantity of traffic associated with the particular cell;
identifying, by the server device, that the particular cell is congested based on the determination that the reserve capacity is less than the threshold;
initiating, by the server device, a load balancing operation based on identifying that the particular cell is congested; and
sending, by the server device and to one or more base stations, of the plurality of base stations that send traffic to the CPE device, a load balancing notification, where the notification:
causes traffic, not destined for the CPE device, to be rerouted to another base station of the plurality of base stations, which enables the base station to send traffic, that complies with the target GOS, to the CPE device, or
causes the CPE device to receive traffic, that complies with the target GOS, from another based station of the plurality of base stations.

2. The method of claim 1, where the target GOS corresponds to a minimum signal strength or a minimum signal quality for which a user of the CPE device has subscribed.

3. The method of claim 1, where initiating the load balancing operation further includes:
determining that a quantity of traffic, being transmitted via the particular cell, is greater than a threshold; and
identifying that the particular cell is congested based on the determination that the quantity of traffic is greater than the threshold.

4. The method of claim 1, further comprising:
retrieving, from a memory associated with the server device, information associated with loading conditions of another cell, of the one or more cells, during a prior period of time;
projecting that the other cell will be congested at a future point in time based on the information associated with the loading conditions during the prior period of time; and
scheduling another load balancing operation at the future point in time based on the projection that the other cell will be congested at the future point in time.

5. The method of claim 1, further comprising:
determining that a threshold deviation associated with other traffic received by the CPE device via another cell, of the one or more cells, is less than a threshold,
where the threshold deviation corresponds to a quantity by which a signal strength, associated with the other traffic, is greater than a minimum signal strength that corresponds to the target GOS, and
where the threshold deviation is obtained from other metrics received from the CPE device or the antenna unit; and
performing another load balancing operation based on the determination that the threshold deviation is less than the threshold.

6. The method of claim 5, where the threshold deviation is based on at least one of a signal-to-interference noise ratio (SINR), a signal-to-noise ratio (SNR), a signal-to-noise distortion ratio (SNDR), or a reference signal received power (RSRP).

7. The method of claim 1, further comprising:
determining that traffic conditions associated with a first cell, of the one or more cells, indicates that the first cell is not congested;
identifying, from the metrics and based on the determination that the first cell is not congested, that a margin by which other traffic, that is received by the CPE device, complies with the target GOS is less than a threshold,
where the margin is based on a measure of signal quality associated with the other traffic and a minimum signal quality associated with the target GOS; and
sending, to a base station associated with the first cell, an instruction to perform a handover operation that includes transferring the other traffic to a second cell, of the one or more cells, that is associated with the base station.

8. The method of claim 7, where the measure of signal quality associated with the other traffic is based on at least one of a reference signal received quality (RSRQ), a channel quality index (CQI), or a channel rank.

9. The method of claim 1, further comprising:
determining a target GOS threshold associated with a signal strength that corresponds to a target GOS associated with the CPE device based on:
retrieving a preconfigured target GOS threshold stored in memory, or
computing a target GOS threshold from one or more marketing requirements.

10. A device comprising:
a memory to store thresholds that correspond to a target grade of service (GOS) associated with a customer premises equipment (CPE) device coupled to the device;
a multiple beam antenna that includes a plurality of beams that receive traffic from a plurality of cells associated with one or more base stations; and
an adaptive beam controller to:
scan the plurality of beams to collect metrics associated with the traffic received from the plurality of cells,
retrieve, from the memory and as a result of the scan, the thresholds that correspond to the target GOS,
process the metrics, based on the thresholds that correspond to the target GOS, to identify a portion of the metrics associated with signals, received from one or more cells of the plurality of cells, that comply with the target GOS, and
send, to a server device, the portion of the metrics that enables the server device to perform a load balancing operation by balancing traffic between the one or more base stations to ensure that the signals received from the one or more cells comply with the target GOS.

11. The device of claim 10, where the metrics include one or more of:
   a unique identifier for each of the one or more cells,
   a quantity of signal strength associated with the signals received from the one or more cells,
   a quantity of signal quality associated with the signals received from the one or more cells,
   a quantity of throughput associated with the signals received from the one or more cells, or
   a quantity of margin between at least one of the quantity of signal strength, the quantity of signal quality, or the quantity of throughput relative to respective thresholds that correspond to the target GOS.

12. The device of claim 10, where, when sending the portion of the metrics to the server device, the adaptive beam controller is to:
   send the portion of the metrics to the server device using a CPE wide area network (WAN) management protocol (CWMP).

13. The device of claim 10, where, when processing the metrics, the adaptive beam controller is further to:
   compare a quantity of signal strength, associated with a signal received from one of the plurality of cells, with a threshold that corresponds to the target GOS,
   store, in a data structure, an identifier associated with the one of the plurality of cells, a value that corresponds to the quantity of signal strength, and the threshold when the quantity of signal strength is greater than the threshold, and
   send the data structure to the server device.

14. The device of claim 13, further comprising:
   discard the identifier associated with the one of the plurality of cells and the value that corresponds to the quantity of signal strength when the quantity of signal strength is less than the threshold.

15. The device of claim 10, where, when processing the metrics the adaptive beam controller is further to:
   generate a value based on a quantity of signal strength associated with a signal received from one of the plurality of cells and a quantity of signal quality associated with the signal received from the one of the plurality of cells; and
   determine whether the signal complies with the target GOS by comparing the value to a threshold that corresponds to the target GOS, where the threshold is associated with a combination of signal strength and signal quality.

16. The device of claim 15, where the quantity of signal strength is associated with:
   a signal-to-interference plus noise ratio (SINR) associated with the signal,
   a reference signal received power (RSRP) associated with the signal, or
   a signal-to-noise ratio (SNR) associated with the signal, and
   where the quantity of signal quality is associated with:
      a reference signal received quality (RSRQ) associated with the signal,
      a channel quality index (CQI) associated with the signal, or
      a channel rank associated with the signal.

17. The device of claim 10, further comprising:
   receiving, at a later point in time and from the server device, an instruction to perform a handover operation from one of the one or more cells to another one of the one or more cells, and
   identifying traffic on the other one of the one or more cells, where the traffic was received via the one of the one or more cells for a period of time that was before the instruction was received.

18. A server device comprising:
   a memory; and
   a processor to:
      receive, from an antenna unit coupled to a client premises equipment (CPE) device, metrics associated with traffic that complies with a target grade of service (GOS) associated with the CPE device, where the metrics identify one or more cells of a plurality of cells via which the CPE device receives the traffic,
      communicate with a plurality of base stations and in response to receiving the metrics, to obtain information associated with traffic conditions for the plurality of base stations,
      determine whether a base station, of the plurality of base stations, that is associated with a cell of the one or more cells, has reached capacity based on the information associated with the traffic conditions,
      where the processor, when determining whether the base station has reached capacity, is to:
         determine whether a value based on a difference between a maximum throughput associated with the base station and an instantaneous throughput is less than a threshold, and
         identify that the base station has reached capacity when the value is less than the threshold, and
      send a load balancing notification to one or more of the plurality of base stations that sends traffic to the CPE device, when the base station has reached capacity, where the load balancing notification:
         causes traffic, not destined for the CPE device, to be rerouted to another one of the plurality of base stations, which enables the base station to send traffic, that complies with the target GOS, to the CPE device, or
         causes the CPE device to receive traffic, that complies with the target GOS, from another one of the plurality of base stations.

19. The server device of claim 18, where the processor is further to:
   determine, based on information obtained from the metrics and when the base station has not reached capacity, whether a signal strength associated with traffic, received by the CPE device via the cell, is greater than a threshold associated with the target GOS by more than a particular quantity, and
   send a handover instruction to the base station when the signal strength associated with the traffic is not greater than the threshold associated with the target GOS by more than the particular quantity,
   where the handover instruction causes the base station to transfer traffic, destined for the CPE device, to another cell, of the one or more cells, to ensure that traffic received by the CPE device, via the other cell, complies with the target GOS.

20. The server device of claim 19, where the processor is further to:
   determine that the handover instruction is not to be sent when the signal strength is greater than the threshold associated with the target GOS by more than the particular quantity,
   where the signal strength being greater than the threshold associated with the target GOS by more than the particular quantity ensures that the traffic received by the CPE device complies with the target GOS.

21. The server device of claim 18, where the metrics, associated with traffic that complies with the target GOS, are received from the antenna unit based on a CPE wide area network (WAN) management protocol (CWMP).

22. The server device of claim 18, where the rerouting of the traffic to the other one of the plurality of base stations is performed using a low latency or high throughput X2 interface that interconnects at least one of the one or more of the plurality of base stations to the other one of the plurality of base stations.

23. The server device of claim 18, where, when determining whether the base station has reached capacity, the processor is to:
   determine whether a quantity of dropped packets, associated with traffic being handled by the base station is greater than a threshold, and
   identify that the base station has reached capacity when the quantity of dropped packets is greater than the threshold.

24. The server device of claim 18, where the processor is further to:
   determine that the base station is not reached capacity,
   retrieve, from a memory associated with the server device and based on the determination that the base station has not reached capacity, historical information associated with traffic conditions for the plurality of base stations, and
   schedule a load balancing operation, at a future point in time, based on the historical information, which indicates that the base station will be congested at the future point in time.

25. The server device of claim 18, where the processor is further to:
   determine a target GOS threshold associated with a signal strength that corresponds to a target GOS associated with the CPE device based on:
   retrieving a preconfigured target GOS threshold stored in memory, or
   computing a target GOS threshold from one or more marketing requirements.

* * * * *